United States Patent
Mestery et al.

(10) Patent No.: US 11,425,030 B2
(45) Date of Patent: Aug. 23, 2022

(54) EQUAL COST MULTI-PATH (ECMP) FAILOVER WITHIN AN AUTOMATED SYSTEM (AS)

(71) Applicant: Cisco Technology, Inc., San Jose, CA (US)

(72) Inventors: Kyle Andrew Donald Mestery, Woodbury, MN (US); Ian James Wells, San Jose, CA (US); Grzegorz Boguslaw Duraj, Vancouver (CA)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 17/066,223

(22) Filed: Oct. 8, 2020

(65) Prior Publication Data

US 2022/0116311 A1 Apr. 14, 2022

(51) Int. Cl.
*H04L 45/24* (2022.01)
*H04L 45/42* (2022.01)
*H04L 47/125* (2022.01)
*H04L 45/021* (2022.01)
*H04L 45/00* (2022.01)

(52) U.S. Cl.
CPC ............ *H04L 45/24* (2013.01); *H04L 45/021* (2013.01); *H04L 45/14* (2013.01); *H04L 45/22* (2013.01); *H04L 45/42* (2013.01); *H04L 47/125* (2013.01)

(58) Field of Classification Search
CPC ....... H04L 45/24; H04L 45/021; H04L 45/14; H04L 45/22; H04L 45/42; H04L 47/125
See application file for complete search history.

(56) References Cited

U.S. PATENT DOCUMENTS

| 10,237,206 | B1 | 3/2019 | Agrawal et al. | |
| 2003/0002443 | A1* | 1/2003 | Basso | H04L 45/00 370/389 |
| 2006/0133282 | A1* | 6/2006 | Ramasamy | H04L 45/00 370/238 |
| 2010/0027427 | A1* | 2/2010 | Kokje | H04L 45/12 370/238 |
| 2011/0267947 | A1* | 11/2011 | Dhar | H04L 47/125 370/235 |

(Continued)

FOREIGN PATENT DOCUMENTS

WO WO2012071906 A1 6/2012
WO WO2018077238 A1 5/2018

*Primary Examiner* — Jimmy H Tran
(74) *Attorney, Agent, or Firm* — Lee & Hayes, P.C.

(57) ABSTRACT

A method may include, with a controller of an AS, routing a data flow from a source device, through at least one front-end node to a plurality of back-end nodes, and balancing, by the controller, the data flow to the back-end nodes equally based at least in part on ECMP routing. A number of routes from the back-end nodes to endpoint devices may be determined based at least in part on a preference for a primary route from the back-end nodes to a corresponding one of the endpoint devices, and backup routes from the back-end nodes to the corresponding one of the endpoint devices. An indication of a failure of a first endpoint device is received, and the back-end nodes utilize a first backup route that is associated with a second endpoint device to rebalance the data flow from the first endpoint device to the second endpoint device.

18 Claims, 9 Drawing Sheets

(56) References Cited

U.S. PATENT DOCUMENTS

| | | | | |
|---|---|---|---|---|
| 2012/0294152 A1* | 11/2012 | Yousefi'zadeh | ...... | H04W 40/12 370/238 |
| 2013/0107712 A1* | 5/2013 | Allan | ...... | H04L 47/125 370/235 |
| 2013/0259056 A1* | 10/2013 | Kotrabasappa | ...... | H04L 45/28 370/389 |
| 2013/0286846 A1* | 10/2013 | Atlas | ...... | H04L 47/726 370/235 |
| 2013/0301640 A9* | 11/2013 | Subramanian | ...... | H04L 45/02 370/389 |
| 2013/0339544 A1 | 12/2013 | Mithyantha | | |
| 2014/0310391 A1 | 10/2014 | Sorenson, III et al. | | |
| 2015/0029855 A1* | 1/2015 | Zheng | ...... | H04L 45/22 370/235 |
| 2015/0078152 A1* | 3/2015 | Garg | ...... | H04L 41/0668 370/254 |
| 2015/0207741 A1* | 7/2015 | Luo | ...... | H04L 45/52 370/235 |
| 2015/0326476 A1* | 11/2015 | Ye | ...... | H04L 45/24 370/235 |
| 2016/0065449 A1* | 3/2016 | Pani | ...... | H04L 45/125 370/235 |
| 2016/0134516 A1* | 5/2016 | Hui | ...... | H04L 45/125 370/235 |
| 2017/0048146 A1* | 2/2017 | Sane | ...... | H04L 45/38 |
| 2017/0093718 A1* | 3/2017 | Lin | ...... | H04L 45/12 |
| 2018/0097725 A1* | 4/2018 | Wood | ...... | H04L 45/02 |
| 2020/0336420 A1* | 10/2020 | Joshi | ...... | G06F 9/45558 |
| 2021/0006490 A1* | 1/2021 | Michael | ...... | H04L 41/142 |
| 2021/0019093 A1* | 1/2021 | Karr | ...... | G06F 9/45558 |

* cited by examiner

US 11,425,030 B2

EQUAL COST MULTI-PATH (ECMP) FAILOVER WITHIN AN AUTOMATED SYSTEM (AS)

TECHNICAL FIELD

The present application generally relates to data communication networks. In particular, the present application relates to systems and methods for using border gateway protocol (BGP) to enable equal cost multi-path (ECMP) routing with deterministic backend failover for traffic distribution.

BACKGROUND

A computer network is a geographically distributed collection of nodes interconnected by communication links and segments for transporting data between nodes (e.g., computing devices), such as servers and endpoints. A network may include, for example, local area networks (LANs) and wide area networks (WANs). LANs may connect the nodes over dedicated private communications links located in the same general physical location, such as a building or campus. WANs, on the other hand, may connect geographically dispersed nodes over long-distance communications links, including, for example, common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes may communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

A data flow may be routed based on a routing strategy to effectively transmit data throughout the computer network. In one example, equal-cost multi-path (ECMP) routing may be employed. ECMP is a routing strategy where packet forwarding to a single destination can occur over multiple "best paths" which tie for top place in routing metric calculations. Multi-path routing can be used in conjunction with most routing protocols, because it is a per-hop decision limited to a single router. In this manner, ECMP may substantially increase bandwidth by load-balancing traffic over multiple paths. With multiple equal-cost routes, ECMP may load balance traffic to a single address between multiple endpoints as a form of line rate load balancing. The load balancing may be performed on a 5-tuple hash to balance between all endpoints within the autonomous system of the computer network. The load balancing may utilize a formula similar to (hash) % (n_endpoints) when determining an endpoint among a plurality of endpoints to which a hashed data flow is to be sent.

However, as occurs at times, an endpoint may fail due to an issue with the endpoint causing the endpoint to come offline. As a result of the endpoint failing, a route is lost from the ECMP pool, and routing associated with a number of other endpoints (n_endpoints) changes. Thus, this failure of the endpoint leads to a radical rebalancing of where data flows are sent within the autonomous system of the computer network. In turn, this rebalancing of the data flows among the remaining endpoints results in a decrease in a number of metrics that define efficiency and effectiveness of data flows within the autonomous system of the computer network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
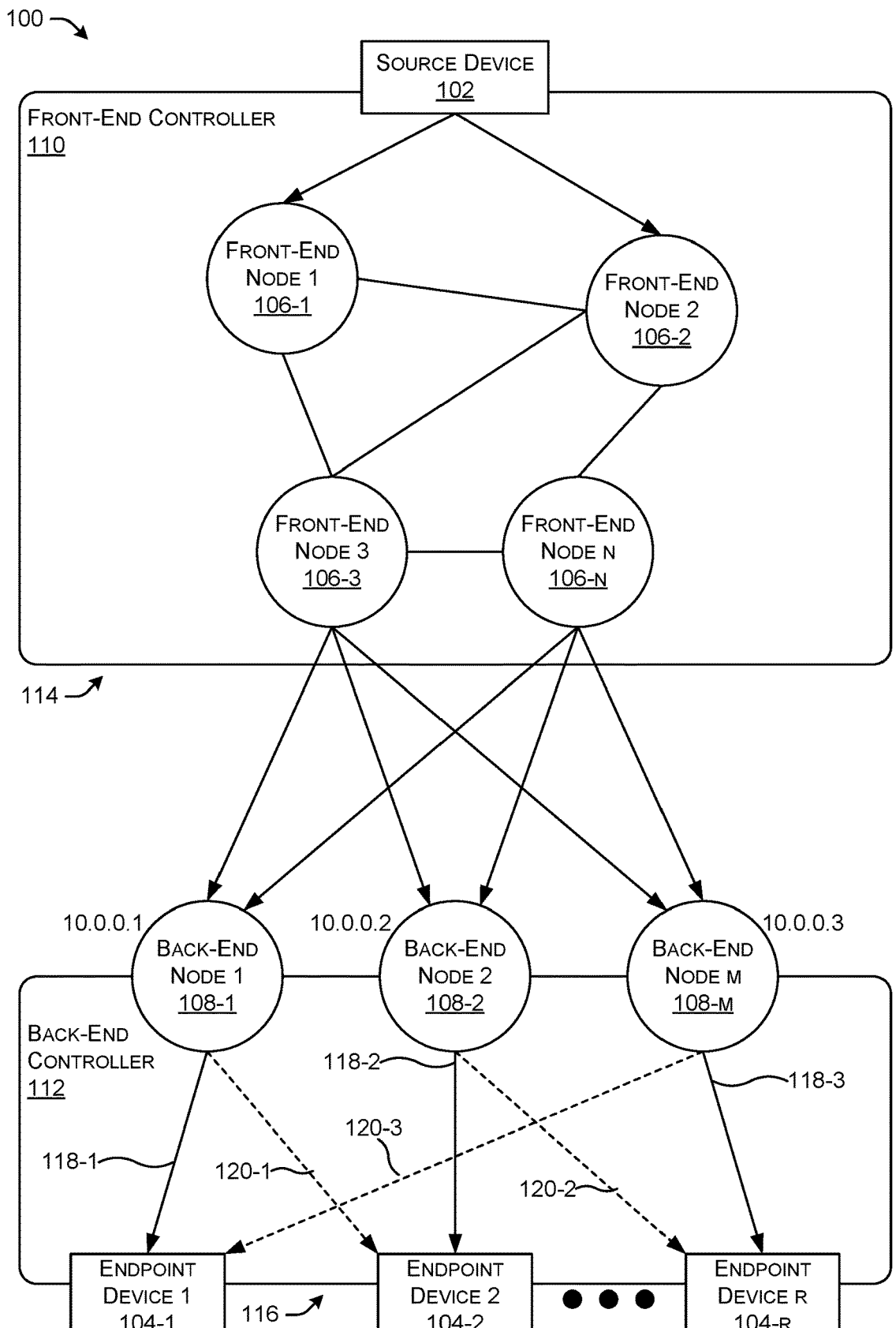
FIG. 1 illustrates a system-architecture diagram of an autonomous system (AS), according to an example of the principles described herein.

This disclosure describes an ECMP "sticky" load balancing with deterministic backend failover nodes providing for load balancing of data flows. The term "sticky" refers to the persistence of the load balancing where all requests in a user session are sent consistently to the same backend device. The autonomous system (AS) of the computer network includes a front-end and a back-end. The front-end causes data flows to be directed through a number of intermediate nodes (e.g., routers) to a number of back-end nodes and on to a number of endpoints. The front-end persistently load balances the data flows such that the same back-end node is consistently used for a given user session. Further, the deterministic backend failover nodes are deterministic such that no randomness is involved in the development of future states of the AS as related to the backend failover nodes and the manner in which data flows are directed to the backend failover nodes. In this manner, the AS will, thus, always produce the same output from a given starting condition or initial state as regarding the load balancing and data flows performed via the backend failover nodes. In the examples described herein, any deterministic model of computation or algorithm may be employed.

Further, in the examples described herein, border gateway protocol (BGP) may be used to enable the ECMP balancing. BGP is an inter-autonomous system routing protocol designed for Transmission Control Protocol/Internet Protocol (TCP/IP) networks. BGP routing protocol defined in RFC4271 employs tie-breaking logic to elect a single best path among multiple possible paths within the computer network. At the same time, BGP implementations allow for ECMP path election and programming of multiple next-hops in routing tables. BGP may be used for routing within an autonomous system (AS). In application where BGP is used for routing within the AS, it may be referred to as Interior or Internal Border Gateway Protocol (IBGP). Further, BGP is a path-vector routing protocol, and makes routing decisions based on paths, network policies, or rule-sets configured by, for example, a network administrator. BGP enables ECMP load balancing without significant effects on a lost endpoint by removing the transfer of and/or the effects of the loss of per-flow data stored in the service for a data flow when the data flow is redirected to another service instance.

The ECMP pool may include a set of routes that may be stored in a routing information base (RIB) or other routing or data table in a controller, a number of routers, and combinations thereof. The set of routes may be defined as follows:

service_ip has a next-hop of
vbackend1
vbackend2
. . .
vbackendN where N is any integer greater than or equal to 1.

The RIB lists the routes to particular network destinations and/or a number of metrics associated with those routes. The RIB may also contain information about the topology of the network immediately around it. The routes defined in the RIB, including, for example, the above example route, may include an indicator mark to denote unusual treatment where the ECMP is required to load balance across a set of non-resolved routes, and not across the ultimate endpoints discovered in resolving these routes. This provides for ensuring that the balancing behavior of data flows over the endpoints does not change for as long as this set does not change. Further this provides for the metrics up to the point of this next-hop resolution to be taken into account when balancing despite the possibility that the resolution of vbackendX may change both the path metric and the resolved destination which may otherwise affect membership and ordering of the ECMP groups.

For each vbackend address there are the following next-hop definitions:

vbackendN has a next-hop of
backendN metric 1
backend_failover metric 2

In one example, the backends may be setup and configured in a key/value (K/V) database as the nodes within the network come online and the control plane for the autonomous system determines back-end failover nodes.

In the examples described herein, all network traffic directed to vbackendN is sent to backendN until a problem such as a failure occurs. When a failure occurs with, for example, an endpoint to which network traffic is directed to via the back-end node (e.g., backendN), a failover process is executed without allowing data regarding the failure including metrics associated with the failure to propagate upstream past the back-end node.

In one example, back-end node (e.g., backendN) may utilize a fast failover protocol such as, for example, bidirectional forwarding detection (BFD) failover protocol. BFD failover protocol is a network protocol that is used to detect faults between two computing devices connected by a link, and provides low-overhead detection of faults. BFD establishes a session between two computing devices over a particular link, and operates independently of media, data protocols, and routing protocols.

BFD is designed to detect failures in communication with a forwarding plane next-hop, and is intended to be implemented in some component of the forwarding engine of a system (e.g., a controller), in cases where the forwarding and control engines are separated. This not only binds the protocol more to the forwarding plane, but decouples the protocol from the fate of the routing protocol engine, making it useful in concert with various "graceful restart" mechanisms for those protocols. BFD may also be implemented in the control engine, though doing so may preclude the detection of some kinds of failures.

BFD operates on top of any data protocol (network layer, link layer, tunnels, etc.) being forwarded between two systems and/or computing devices. BFD may be run in a unicast, point-to-point mode. BFD packets are carried as the payload of whatever encapsulating protocol is appropriate for the medium and network. BFD may be running at multiple layers in a system. The context of the operation of any particular BFD session is bound to its encapsulation.

BFD can provide failure detection on any kind of path between systems, including direct physical links, virtual circuits, tunnels, MPLS Label Switched Paths (LSPs), multi-hop routed paths, and unidirectional links (so long as there is some return path). Multiple BFD sessions may be established between the same pair of systems when multiple paths between them are present in at least one direction, even if a lesser number of paths are available in the other direction (e.g., multiple parallel unidirectional links or MPLS LSPs).

The BFD state machine implements a three-way handshake, both when establishing a BFD session and when tearing it down for any reason, to ensure that both systems are aware of the state change. BFD can be abstracted as a simple service. The service primitives provided by BFD are to create, destroy, and modify a session, given the destination address and other parameters. BFD in return provides a signal to its clients indicating when the BFD session goes up or down. In the present description, BFD may be used over endpoint links. For example, the server providing the endpoint may also run BFD over its uplinks to ensure the link is healthy and provide a fast-withdraw when the link is not healthy. BFD may also respond to application health metrics. For example, BFD may be stopped on the server when the service is no longer functioning correctly. In this manner, a back-end domain of an AS may respond quickly to a failure of an endpoint.

Returning again to the next-hop definitions described above, should backendN fail, the metric 2 route may, instead, be used to route traffic for vbackendN to backend_failover. For the purposes of the ECMP routes, while the recursive next-hop has changed and the path metric has increased, the ECMP algorithm ignores both of these changes and continues to balance the data flows as was performed before the failure of the endpoint and the failover process. In most instances, it may be expected that single point failures may occur. In other words, a single endpoint may fail at any given time. Thus, it makes sense to direct all failover routes to the same backend_failover node or to a small set of backend_failover nodes.

In one example, instead of breaking the route resolution in BGP into two halves, the autonomous system may alter the internet protocol (IP) address/media access control (MAC) address/link mapping. In this example, a BFD failure on the primary address may promote a backup MAC/link to be associated with the IP in the layer 2 (L2) address lookup of the last router in the fabric of the computer network. This example may provide the same handover effect as the BFD method. Other software-defined networking (SDN) solutions may be used to change this behavior by controlling the last route association described above.

In one example, the ECMP failover system and methods may be cloud-based. In this example, the processes described herein may occur as an on-demand availability of computer system resources (e.g., infrastructure as a service (IaaS), hardware as a service (HaaS), Internet of Things as a Service (IoTaaS), load balancing as a service (LBaaS), network as a service (NaaS), function as a service (FaaS), software as a service (SaaS), anything as a service (XaaS), among others) including data storage (cloud storage) and computing power, without direct active management by the user.

In the example processes described herein, the ECMP balancing is independent of the end of the route, and allows a two-step resolution process that prevents ECMP from being affected in any way by expected route changes in failure events.

Examples described herein provide a method for providing ECMP failover or data flows within an AS. The method may include, with a controller of an autonomous system (AS), routing a data flow from a source device, through at least one front-end node associated with a front-end of the AS to a plurality of back-end nodes associated with a back-end of the AS, and balancing, by the controller, the data flow to the back-end nodes equally based at least in part on equal-cost multi-path (ECMP) routing. The method may further include determining, by the controller, a number of routes from the back-end nodes to a plurality of endpoint devices, the routes being determined based at least in part on a preference for a primary route from the back-end nodes to a corresponding one of the endpoint devices, and a plurality of backup routes from the back-end nodes to the corresponding one of the endpoint devices. The method may further include receiving, at the controller, an indication of a failure of a first endpoint device of the plurality of endpoint devices, and instructing the back-end nodes to utilize a first backup route of the plurality of backup routes that is associated with a second endpoint device to rebalance the data flow from the first endpoint device to the second endpoint device.

The method may further include restricting leakage of at least one metric from the back-end to the front-end. Executing ECMP routing is based at least in part on a routing table defined by the controller. Executing ECMP routing is based at least in part on border gateway protocol (BGP). The method may further include removing a second backup route directed to the first endpoint device based at least in part on the indication of the failure of the first endpoint device. Executing the ECMP routing includes load balancing the data flow across the back-end nodes irrespective of the endpoint devices discovered in resolving the ECMP routing. The method may further include storing configuration data associated with the back-end nodes in a key/value database of the controller. Instructing the back-end nodes to utilize the first backup route associated with the first endpoint device to rebalance the data flow includes executing a bidirectional forwarding detection (BFD) failover protocol. The plurality of backup routes include relatively higher metrics than the primary routes Examples described herein provide a system for providing ECMP failover or data flows within an AS. The system may include one or more processors, and one or more non-transitory computer-readable media storing instructions that, when executed by the one or more processors, cause the one or more processors to perform operations including routing a data flow from a source device, through at least one front-end node associated with a front-end of an autonomous system (AS) to a plurality of back-end nodes associated with a back-end of the AS, and executing, with a controller, equal-cost multi-path (ECMP) routing to balance the data flow to the back-end nodes equally. The method further includes determining, by the controller, a number of routes from the back-end nodes to a plurality of endpoint devices, the routes being determined based at least in part on a preference for a primary route from the back-end nodes to a corresponding one of the endpoint devices, and a plurality of backup routes from the back-end nodes to the corresponding one of the endpoint devices. The method further includes receiving, at the controller, an indication of a failure of a first endpoint device of the plurality of endpoint devices, and instructing the back-end nodes to utilize a first backup route of the plurality of backup routes that is associated with a second endpoint device to rebalance the data flow from the first endpoint device to the second endpoint device.

The operations further include restricting leakage of at least one metric from the back-end to the front-end. Executing ECMP routing is based at least in part on a routing table defined by the controller. Executing ECMP routing is based at least in part on border gateway protocol (BGP). The operations further include removing a second backup route directed to the first endpoint device based at least in part on the indication of the failure of the first endpoint device. Executing the ECMP routing includes load balancing the data flow across a the back-end nodes irrespective of the endpoint devices discovered in resolving the ECMP routing. The operations further include storing configuration data associated with the back-end nodes in a key/value database of the controller. Instructing the back-end nodes to utilize the first backup route associated with the first endpoint device to rebalance the data flow includes executing a bidirectional forwarding detection (BFD) failover protocol. The plurality of backup routes include relatively higher metrics than the primary routes.

Examples described herein provide a non-transitory computer-readable medium storing instructions that, when executed, cause one or more processors to perform operations, including, with a controller of an autonomous system (AS), routing a data flow from a source device, through at least one front-end node associated with a front-end of the AS to a plurality of back-end nodes associated with a back-end of the AS, and balancing, by the controller, the data flow to the back-end nodes equally based at least in part on equal-cost multi-path (ECMP) routing. The operations may further include determining, by the controller, a number of routes from the back-end nodes to a plurality of endpoint devices, the routes being determined based at least in part on a preference for a primary route from the back-end nodes to a corresponding one of the endpoint devices, and a plurality of backup routes from the back-end nodes to the corresponding one of the endpoint devices. The operations may further include receiving, at the controller, an indication of a failure of a first endpoint device of the plurality of endpoint devices, and instructing the back-end nodes to utilize a first backup route of the plurality of backup routes that is associated with a second endpoint device to rebalance the data flow from the first endpoint device to the second endpoint device.

The operations further including restricting leakage of at least one metric from the back-end to the front-end. Executing the ECMP routing includes load balancing the data flow across the back-end nodes irrespective of the endpoint devices discovered in resolving the ECMP routing. Executing the ECMP routing includes adjusting a mapping within a routing table to include a backup link.

Additionally, the techniques described in this disclosure may be performed as a method and/or by a system having non-transitory computer-readable media storing computer-executable instructions that, when executed by one or more processors, performs the techniques described above.

EXAMPLE EMBODIMENTS

Figure 2:
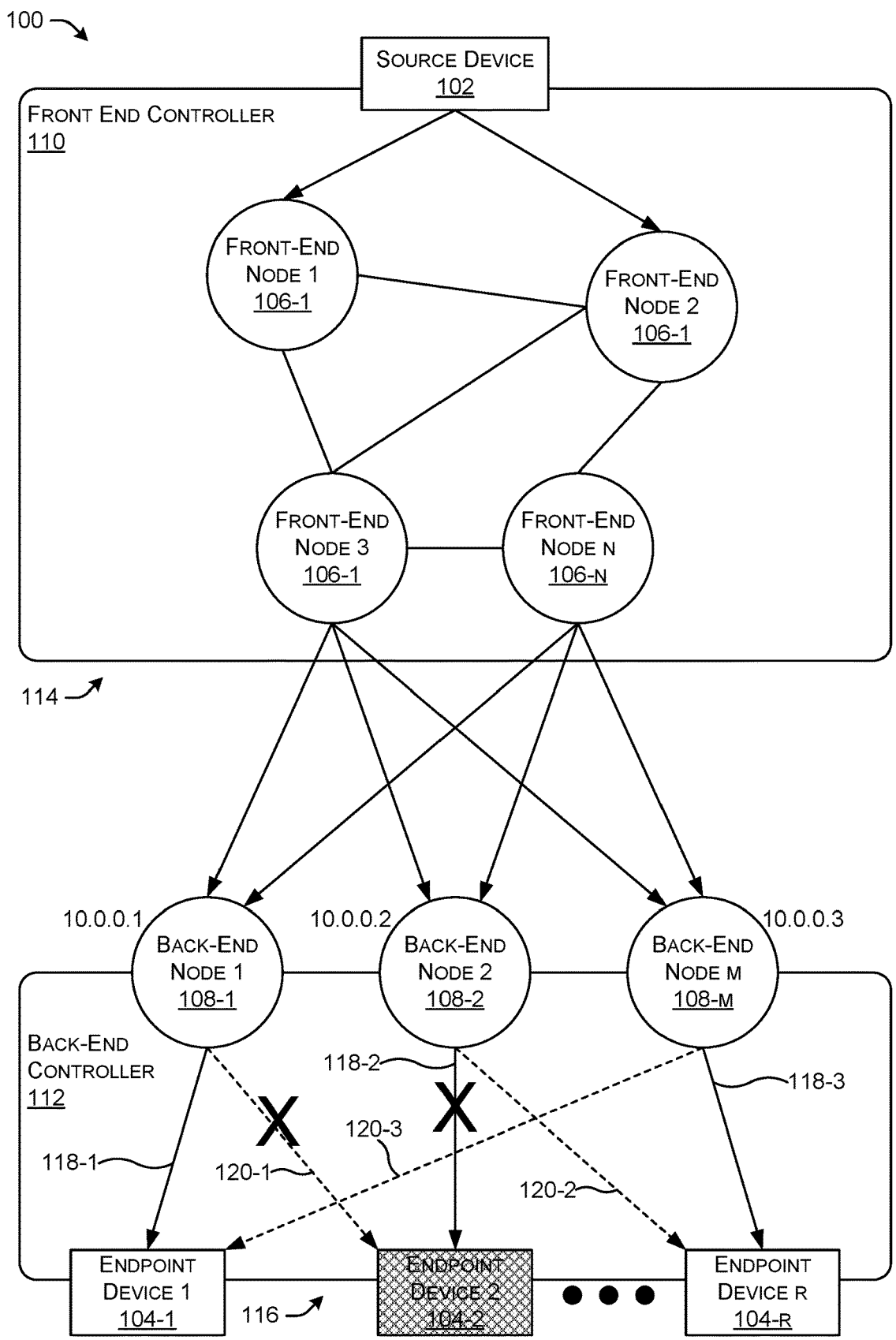
FIG. 2 illustrates a system-architecture diagram of the AS of FIG. 1 during a failure instance, according to an example of the principles described herein.
Figure 3:
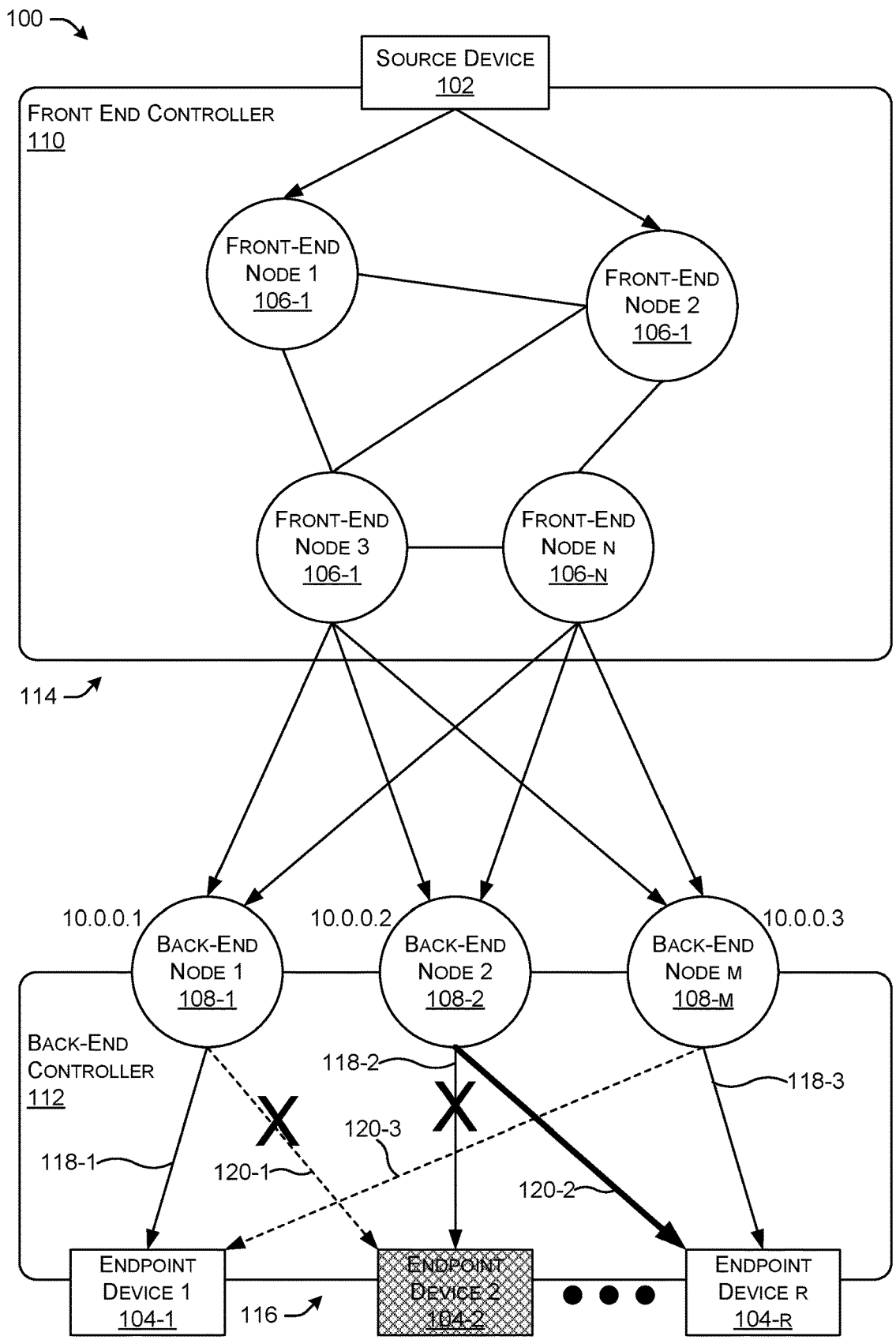
FIG. 3 illustrates a system-architecture diagram of the AS of FIG. 1 during a failover instance and recovery of a failure instance, according to an example of the principles described herein.

FIG. 1 illustrates a system-architecture diagram of an autonomous system (AS), 100 according to an example of the principles described herein. FIG. 2 illustrates a system-architecture diagram of the AS 100 of FIG. 1 during a failure instance, according to an example of the principles described herein. FIG. 3 illustrates a system-architecture diagram of the AS of FIG. 1 during a failover instance and recovery of a failure instance, according to an example of the principles described herein. The AS 100 may include a front-end 114 and a back-end 116. The front-end 114 may be primarily used to send queries and requests, and receive data from the back-end 116. In one example, the front-end 114 may include a front-end controller 110 to control the flow of data throughout the AS 100 from a source device 102 to a plurality of back-end nodes 108-1, 108-2, 108-M, where M is any integer greater than or equal to 1 (collectively referred to herein as back-end node(s) 108 unless specifically addressed otherwise). Although three back-end nodes 108 are depicted in the example of FIGS. 1 through 3, any number of back-end nodes 108 may be included to provide more or less routes to the endpoint devices 104. The back-end 116 may include a back-end controller 112 to control the flow of data throughout the back-end 116 of the AS 100 from the plurality of back-end nodes 108 to a plurality of endpoint devices 104-1, 104-2, 104-R, where R is any integer greater than or equal to 1 (collectively referred to herein as endpoint(s) 104 unless specifically addressed otherwise). The front-end controller 110 and the back-end controller 112 may be any computer processing device configured to execute one or more stored instructions and that serve to bring about the functionality described herein. For example, the front-end controller 110 and the back-end controller 112 may include a central processing unit (CPU), a microprocessor, a multi-core processor, a digital signal processor (DSP), a neural processing unit (NPU), a field-programmable gate array (FPGA), and combinations thereof. Further, the front-end controller 110 and the back-end controller 112 may include additional computing resources including data storage devices, network interfaces, and other computing resources as further described herein.

In one example, the front-end controller 110 and the back-end controller 112 of the AS 100 may be the same device. In this example, the combined front-end controller 110/back-end controller 112 may control the processes performed within the front-end 114 and the back-end 116 in a segregated manner such that the front-end 114 is controlled in a first manner and the back-end 116 is controlled in a second manner. For example, the front-end 114 may be controlled based on BGP to enable persistent ECMP load balancing, and the back-end 116 may be controlled based on deterministic failover with relation to the flow of data between the back-end nodes 108 and the endpoint devices 104. In this manner, and in the examples described herein, the ECMP balancing performed at the front-end 114 is independent of the end of the route, and a two-step resolution process is provided that that prevents ECMP from being affected in any way by expected route changes in failure events within the back-end 116.

The source device 102 may be any device that may communicate with the plurality of endpoint devices 104. In one example, the source device 102 may include a workstation, a desktop computer, a laptop, a tablet, a network appliance, an e-reader, a smartphone, a server, a switch, a router, a hub, a bridge, a gateway, a modem, a repeater, an access point, or other computing devices.

The endpoint devices 104 may include any computing device that may communicates across a network that includes the AS 100, and may include any network connected device that serves as a user endpoint. The endpoint devices 104 may include, for example, workstation, a desktop computer, a laptop, a tablet, a network appliance, an e-reader, a smartphone, a server, a switch, a router, a hub, a bridge, a gateway, a modem, a repeater, an access point, or other computing devices. In one example, the endpoint devices 104 may include an Internet-connected hardware device within a transmission control protocol (TCP)/Internet protocol (IP) (TCP/IP) network.

At an outset of the formation of the AS 100, the front-end controller 110 may detect and/or identify a plurality of front-end nodes 106-1, 106-2, 106-3, 106-N, where N is any integer greater than or equal to 1 (collectively referred to herein as front-end node(s) 106 unless specifically addressed otherwise). Although four front-end nodes 106 are depicted in the front-end 114, any number of front-end nodes 106 may be included within the AS 100 to transmit data through the AS 100. The front-end nodes 106 and the back-end nodes 108 serve as points of connection of the transmission medium to transmitters and receivers of the electrical, optical, or radio signals carried in the medium within the AS 100. The front-end nodes 106 and the back-end nodes 108 may be and networking device capable of transmitting data within the AS 100. The front-end nodes 106 and the back-end nodes 108 may include, for example, network interface controllers (NICs), repeaters, hubs, bridges, switches, routers, modems, gateways, and firewalls, among other types of networking devices.

The front-end nodes 106 may be connected using any type of network topology including, for example, a mesh network topology, a tree network topology, a ring network topology, a star network topology, a bus network topology, a full connected network topology, a partially connected network topology, and a point-to-point network topology, among other types of network topologies. The front-end nodes 106 may serve to transmit data packets throughout the AS 100, and specifically, from the source device 102 to the back-end nodes 108. The front-end controller 110 executes the BGP and ECMP to load balance data transmissions from the source device 102 to the back-end nodes 108 via one or more of the front-end nodes 106. The execution of the ECMP causes data flows or data sessions to be transmitted in a load-balanced manner to the back-end nodes 108. Specifically, RFC2991 defines multi-path routing where packet forwarding to a single destination may occur over multiple 'best paths' which tie for top place in routing metric calculations. The effect of multipath routing on the front-end controller 110 may be that the front-end controller 110 potentially has several next-hops for any given destination (e.g., the back-end nodes 108) and is to use some method to choose which next-hop should be used for a given data packet.

As used in the present specification and in the appended claims, the terms "flow," "data flow," or similar language is meant to be understood broadly as representing the granularity at which the front-end nodes 106 and/or back-end nodes 108 keep state (if at all) for classes of data traffic. The exact definition of a flow may depend on the actual implementation. For example, a flow may be identified solely by destination address, or it may be identified by (source address, destination address, protocol id) triplet. Including transport-layer information in the next-hop selection process can actually be problematic. For example, if packets are fragmented, the transport-layer information may not be available in every packet. Furthermore, having the choice of path depend on transport-layer fields may negate the benefit of caching information such as maximum transmission unit (MTU) for use in subsequent connections between the same endpoints or nodes. The issues noted above may arise when packets in the same unicast or multicast "flow" of data are split among multiple paths. ECMP, therefore, ensures that packets for the same data flow always use the same path. The front-end controller 110, executing the ECMP, causes the data flows to utilize the same path through the front-end nodes 108 to the back-end nodes 106.

As noted above, BGP enables ECMP load balancing without significant effects on a lost or failed endpoint device 104 by removing the transfer of and/or the effects of the loss of per-flow data stored in the service for a data flow when the data flow is redirected to another service instance. In order to improve efficiency in symmetric network topologies multiple "equivalent" paths may be selected for the same prefix. In one example, the tie-breaking process may be stopped after comparing an internal gateway protocol (IGP) cost for the next-hop attribute and selecting all internal BGP (iBGP) paths that remained equivalent under the tie-breaking rules. The steps that compare the BGP identifier and BGP peer IP addresses may be ignored for the purpose of multipath routing. BGP implementations may be configured to specify a maximum number of equivalent paths that may be programmed to the routing table (e.g., the RIB). Further BGP implementations may be configured to enable multipath separately for iBGP-learned paths.

The paths that are candidates for ECMP selection may include the same path length, computed using the logic defined in RFC4271 and RFC5065 (e.g., ignoring the AS_SET, AS_CONFED_SEQUENCE, and AS_CONFED_SET segment lengths). The content of the latter attributes is used purely for loop detection. When all paths for a prefix are learned via iBGP, the tie-breaking may occur based on an IGP metric of the next-hop attribute, since iBGP is used along with an underlying IGP. When iBGP is deployed with BGP route-reflectors per RFC4456, the path attribute list may include the CLUSTER_LIST attribute. Most implementations commonly ignore it for the purpose of ECMP route selection, assuming that IGP cost along should be sufficient for loop prevention. This assumption may not hold when IGP is not deployed, and instead iBGP session are configured to reset the next-hop attribute on every node. Further, this also assumes the use of directly connected link IP addresses for session formation. In this example, ignoring CLUSTER_LIST length might lead to routing loops. Therefore, in one example, accounting for CLUSTER_LIST length may be enabled when performing multipath route selection. In this example, CLUSTER_LIST attribute length should be effectively used to replace the IGP metric.

The use of BGP confederations assumes presence of an IGP for proper loop prevention in multipath scenarios, and use the IGP metric as the final tie-breaker for multipath routing. Further, in one example, implementation may require that equivalent paths belong to the same peer member AS as the best-path. In these examples, "multipath same confederation member peer-as" may be enabled and/or a less restrictive "confed as-path multipath relaxed" may be enabled which allows selecting multipath routes going via any confederation member peer AS. As mentioned above, the AS_CONFED_SEQUENCE value length is usually ignored for the purpose of path length comparison, relying on IGP cost instead for loop prevention. In an example where IGP is not present with BGP confederation deployment, AS_CONFED_SEQUENCE length may be considered when selecting the equivalent routes, effectively using it as a substitution for IGP metric.

Even though multiple equivalent paths may be selected for programming into the routing table (e.g., the RIB), the front-end controller 110 and/or the front-end nodes 106 executing BGP may announce a single best-path to its peers. The unique best-path may be selected among the multi-path set using the tie-breaking rules described herein. In one example, a non-standard tie-breaking process may be implemented using an oldest path rule to improve routing stability. In this example, the non-standard tie-breaking process may interact with multi-path route selection on downstream BGP executing devices. After a routing issue that affects the best-path upstream, the original best path may not be recovered, and the older path may still be advertised. This may possibly affect the tie-breaking rules on down-stream devices, for example if the AS_PATH contents are different from previous instances.

In the examples described herein, metrics associated with the transmission of data through the AS 100 may be obtained by the front-end controller 110 and the back-end controller 112. These metrics may be stored within a data storage device of the front-end controller 110 and the back-end controller 112, respectively. The metrics assist the front-end controller 110 and the back-end controller 112 in determining a best route through which data may be transmitted, and may include, for example, at least one of a number of request counts, a rate of requests, flow counts, active connection counts, error rates, a latency, rejected connection counts, and failed connection counts, among other metrics that assist in determining routing of data flows and load balancing within the AS 100.

In transmitting data throughout the AS 100, the AS 100 (or a set of ASes sharing routes and metrics) may be utilized, and all the endpoint devices 104 may be advertised as next-hops for the service address. The front-end controller 110 of the AS 100 may route a data flow from the source device 102 associated with the front-end controller 110 to the plurality of back-end nodes 108 associated with the back-end controller of the AS 100. The AS 100 may define to the front-end controller 110 that balancing of the data flow to the back-end nodes 108 includes executing ECMP routing with the back-end nodes 108 having equal metrics such that the front-end controller 110 balances the data flow among the back-end nodes 108 equally.

With the three endpoint devices depicted in FIGS. 1 through 3, data flows may be hashed and balanced across the three endpoint devices 104 with a function such as, for example, mod(hash(packet-header), n-endpoints). For example, the data packets may be addressed to address 1.2.3.4 signifying the address of the source device 102. If the back-end nodes 108 were not present in the example of FIGS. 1 through 3, the packets would be sent to the address 1.2.3.4 via the endpoint devices 104. However, the examples described herein include the back-end nodes 108 that serve to bifurcate the AS 100 creating the front-end 114 and the back-end 116. Thus, the data packets are sent to address 1.2.3.4 via the back-end nodes 108 via addresses 10.0.0.1, 10.0.0.2, and 10.0.0.3, the addresses of the back-end nodes 108, respectively. The execution of BGP and ECMP may cause a portion of the data packets to be sent to these addresses of the back-end nodes 108 in a load-balanced manner. The ECMP endpoint count remains the same throughout the operation including throughout a failure and failover instance such that the front-end 114 of the AS 100 including the front-end controller 110 and/or the front-end nodes 106 are unaware of any failure of any of the endpoint devices 104. Further, the load balancing performed by the execution of the BGP and ECMP remains consistent. Thus, executing ECMP routing within the AS 100 is based at least in part on BGP.

The back-end 116, as controlled by the back-end controller 112, defines a number of primary routes 118-1, 118-2, 118-3 (collectively referred to herein as primary route(s) 118 unless specifically addressed otherwise), and a corresponding number of secondary or failover routes 120-1, 120-2, 120-3 (collectively referred to herein as failover route(s) 120 unless specifically addressed otherwise). The primary routes 118 are identified in FIGS. 1 through 3 using solid lines. Further, the failover routes 120 are identified in FIGS. 1 through 3 using dashed lines. Still further, a selected failover route 120-2 is identified in FIG. 3 using a bold line. The AS 100 may define with relation to the back-end controller 112 a number of routes 118, 120 from the back-end nodes 108 to the plurality of endpoint devices 104. The routes 118, 120 may be defined based at least in part on a preference for a primary route 118 from each of the back-end nodes 108 to a corresponding one of the endpoint devices 104. Further, the routes 118, 120 may be defined based at least in part on a plurality of backup routes (e.g., the failover routes 120) from the back-end nodes 108 to the corresponding one of the endpoint devices 104 that includes relatively higher metrics than the primary route 118. In the example of FIGS. 1 through 3, the primary routes 118 are directed from a back-end node 108 to a respective endpoint device 104. Further, the failover routes 120 are directed from a back-end node 108 to an endpoint device 104 such that a next endpoint device 104 is the failover device for that back-end node, respectively. In the example of FIGS. 1 through 3, the failover route 120-1 is between back-end node 108-1 and endpoint device 104-2. Further, the failover route 120-2 is between back-end node 108-2 and endpoint device 104-R. Still further, the failover route 120-3 is between back-end node 108-M and endpoint device 104-1.

In the examples described herein, the endpoint device 104 to which the failover route 120 is directed has relatively higher metric(s) as compared to the primary endpoint device 104. In the example depicted in FIGS. 1 through 3, the failover routes 120 are directed to one of the remaining endpoint devices 104 such that the entirety of the data flow handled by the failed endpoint device 104 is directed to a failover node via the respective failover route 120. Thus, because the endpoint device 104 to which the failover route 120 is directed has relatively higher metric(s) as compared to the primary endpoint device 104, the endpoint device 104 to which the failover route 120 is directed may be able to handle the additional traffic without a significant negative effect on the data flow. The example of routing in the back-end 116 as depicted in FIGS. 1 through 3 depicts a failover endpoint device (e.g., endpoint device 104-2) that is tasked with taking two times its "sunny day," non-failure traffic in the event of a failure. However, in one example, the routing here may take other forms including, for example, the failover routes 120 for endpoint device 104-2 may include all the other endpoint devices other than the failed endpoint device 104-2 so the traffic for endpoint device 104-1 and endpoint device 104-3 may each be defined using the formula 1+1/(N−1). In the example of FIGS. 1 through 3, each remaining endpoint device 104-1, 104-3 1.5, but with a larger pool of endpoint devices 104, this number is reduced towards 1 although the number will never reach 1. Use of this formula in partitioning the failover traffic among the remaining endpoint devices 104 greatly reduces as the pool of endpoint devices 104 grows.

However, as mentioned above, an endpoint device 104 may fail causing the endpoint device 104 to come offline and dropping at least a portion of the data flow including a portion of the data flow allotted to the endpoint device 104-2. The AS 100 including the back-end controller 112 may receive an indication of a failure of an endpoint device 104. In FIGS. 2 and 3, endpoint device 104-2 is in a state of failure. As a result of the endpoint device 104-2 failing, both the primary route 118-2 and the failover route 120-1 are no longer available to handle data flows. Thus, in addition to the primary route 118, a second backup route (e.g., failover route 120-1) directed to the failed endpoint device 104-2 is removed based at least in part on the indication of the failure of the failed endpoint device 104-2. Instead the failover route between the back-end node 108-2 and the endpoint device R 104-R is used to transmit the portion of the data flow originally load balanced to endpoint device 104-2 from back-end node 108-2. Thus, the back-end controller 112 may instruct the back-end nodes 108 to utilize a first backup route (e.g., failover route 120-2) associated with the first endpoint device to rebalance the data flow as indicated by the dashed line of failover route 120-2 in FIG. 2 being changed to a bold line in FIG. 3.

It is noted that metrics obtained at the back-end 116 and/or by the back-end controller 112 regarding the failure of one or more of the endpoint devices 104 and/or the transfer of data from the back-end nodes 108 to the endpoint devices 104 is not shared with the front-end 114 including the front-end controller 110. These metrics are restricted in this manner in order to bifurcate the AS 100 creating the front-end 114 and the back-end 116 in order to ensure that any failures that occur within the back-end 116 do not effect the operation of the load balancing processes as executed by the BGP and ECMP. From the perspective of the front-end 114, during a failure of an endpoint device 104, all the routes to have equal metrics and the front-end controller 110 is unaffected and evenly balances traffic. In contrast, the red AS starts using a failover route 120 for some of the traffic. This means that traffic may be consistently reassigned from one back-end node 108 to another without effecting the load balancing performed by the front-end controller 110. In this manner, the AS 100 including the back-end controller 112 restricts leakage of metrics from the back-end 116 including the back-end controller 112 to the front-end 114 to the front-end controller 110.

The back-end controller 112 may instruct the back-end nodes 108 to utilize the first failover route 120 associated with the failed endpoint device 104-2 to rebalance the data flow includes executing a bidirectional forwarding detection (BFD) failover protocol. AS described above, the BFD failover protocol is a network protocol that is used to detect faults between two computing devices connected by a link, and provides low-overhead detection of faults. BFD establishes a session between two computing devices over a particular link, and operates independently of media, data protocols, and routing protocols.

In on example, configuration data associated with the back-end nodes 108 may be stored in a key/value database of the back-end controller 112. The topology of the back-end 116 may be setup and configured in a key/value (K/V) database as the back-end nodes 108 within the AS 100 come online and the control plane for the AS 100 determines how the back-end nodes 108 are to perform the failover processing.

With regard to the front-end 114 and in the examples described herein, executing ECMP routing may be based at least in part on a routing table defined by the front-end controller. For example, the ECMP pool may include a set of routes that may be stored in a routing information base (RIB) or other routing or data table in a controller, a number of routers, and combinations thereof. The RIB lists the routes to particular network destinations and/or a number of metrics associated with those routes. The RIB may also contain information about the topology of the network immediately around it. The routes defined in the RIB, including, for example, the above example route, may include an indicator mark to denote unusual treatment where the ECMP is required to load balance across a set of non-resolved routes, and not across the ultimate endpoints discovered in resolving these routes. This provides for ensuring that the balancing behavior of data flows over the endpoint devices 104 does not change for as long as this set does not change. Further this provides for the metrics up to the point of this next-hop resolution to be taken into account when load balancing despite the possibility that the resolution of the back-end nodes 108 may change both the path metric and the resolved destination which may otherwise affect membership and ordering of the ECMP groups. Thus, executing the ECMP routing includes load balancing the data flow across the back-end nodes 108 irrespective of the endpoint devices 104 discovered in resolving the ECMP routing. In one example, executing the ECMP routing includes adjusting a mapping within the routing table to include a backup link such as the failover route 120 as depicted in FIGS. 1 through 3.

Figure 4:
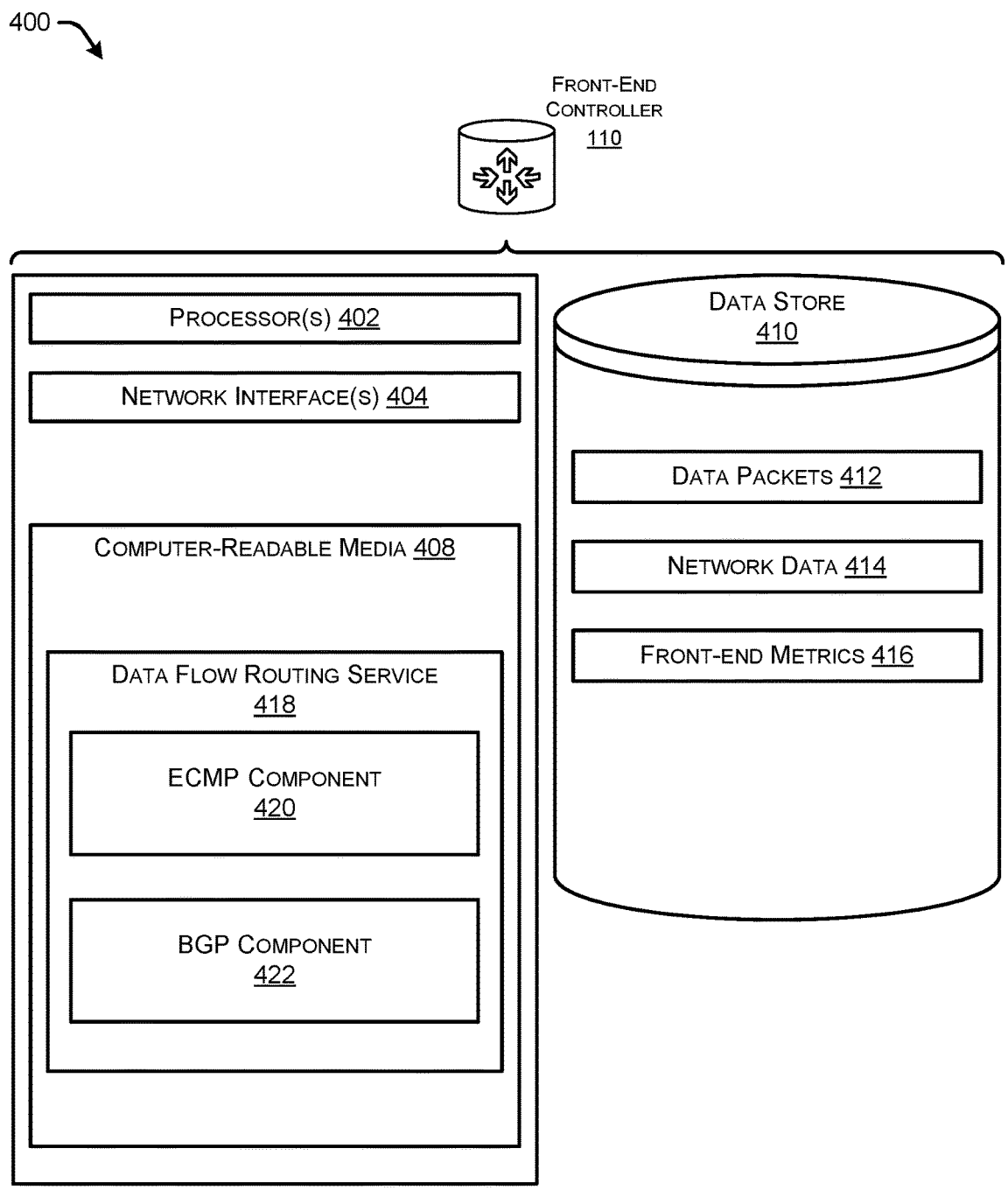
FIG. 4 is a component diagram of example components of a front-end controller of the AS of FIG. 1, according to an example of the principles described herein.

FIG. 4 is a component diagram 400 of example components of a front-end controller 110 of the AS 100 of FIG. 1, according to an example of the principles described herein. As illustrated, the front-end controller 110 may include one or more hardware processor(s) 402, one or more devices, configured to execute one or more stored instructions. The processor(s) 402 may comprise one or more cores. Further, the front-end controller 110 may include one or more network interfaces 404 configured to provide communications between the front-end controller 110 and other devices, such as the front-end nodes 106 within the front-end 114, the back-end nodes 108 within the back-end 116, and the endpoint devices 104. The network interface(s) 404 may include devices configured to couple to personal area networks (PANs), wired and wireless local area networks (LANs), wired and wireless wide area networks (WANs), and so forth. For example, the network interfaces 404 may include devices compatible with the wired and/or wireless communication technologies and protocols described herein.

The front-end controller 110 may also include computer-readable media 408 that stores various executable components (e.g., software-based components, firmware-based components, etc.). In addition to various components discussed herein, the computer-readable media 408 may further store components to implement functionality described herein. While not illustrated, the computer-readable media 408 may store one or more operating systems utilized to control the operation of the one or more devices that comprise the front-end controller 110. According to one example, the operating system comprises the LINUX operating system. According to another example, the operating system(s) comprise the WINDOWS SERVER operating system from MICROSOFT Corporation of Redmond, Wash. According to further examples, the operating system(s) may comprise the UNIX operating system or one of its variants. It may be appreciated that other operating systems may also be utilized.

Additionally, the front-end controller 110 may include a data store 410 which may comprise one, or multiple, repositories or other storage locations for persistently storing and managing collections of data such as databases, simple files, binary, and/or any other data. The data store 410 may include one or more storage locations that may be managed by one or more database management systems. The data store 410 may store, for example, data packets 412 for distribution to the front-end nodes 106, the back-end nodes 108, and the endpoint devices 104. The data packets 412 may include data sent via the AS 100 in a data session and within a data flow as described herein.

Further, the data store 410 may store network data 414. The network data 414 may include any data defining network topologies of the AS 100 including the front-end 114 and/or the back-end 116, the front-end nodes 106 and the links between the front-end nodes 106, the back-end nodes 108, the endpoint devices 104, and the links between the back-end nodes 108 and the endpoint devices 104, among other topological characteristics of the AS 100. Further, the network data 414 may include the RIB or other routing table that defines the routing information within the AS 100.

The data store 410 may also store front-end metrics 416 used in execution of the ECMP and BGP. In one example, the front-end metrics 416 may be stored along with the network data 414 in the RIB or other routing table within the data store 410. In this example, the RIB may list routes to particular network destinations along with a number of corresponding metrics associated with those routes.

The computer-readable media 408 may store portions, or components, of a data flow routing service 418 described herein. For instance, the data flow routing service 418 of the computer-readable media 408 may include an ECMP component 420 to, when executed by the processor(s) 402, load-balance data traffic over multiple paths within the AS 100 as described herein. Further, the ECMP component 420 may adjust a mapping within the RIB to include a backup link for the back-end nodes 108.

In conjunction with the ECMP component 420, the data flow routing service 418 may further include a BGP component 422 to, when executed by the processor(s) 402, enable the ECMP balancing by employing tie-breaking logic to elect a single best path among multiple possible paths within the AS 100 and program multiple next-hops in routing tables such as the RIB. Further, the BGP component 422, when executed by the processor(s) 402, may serve as a path-vector routing protocol and make routing decisions based on paths, network policies, or rule-sets configured by, for example, a network administrator.

Figure 5:
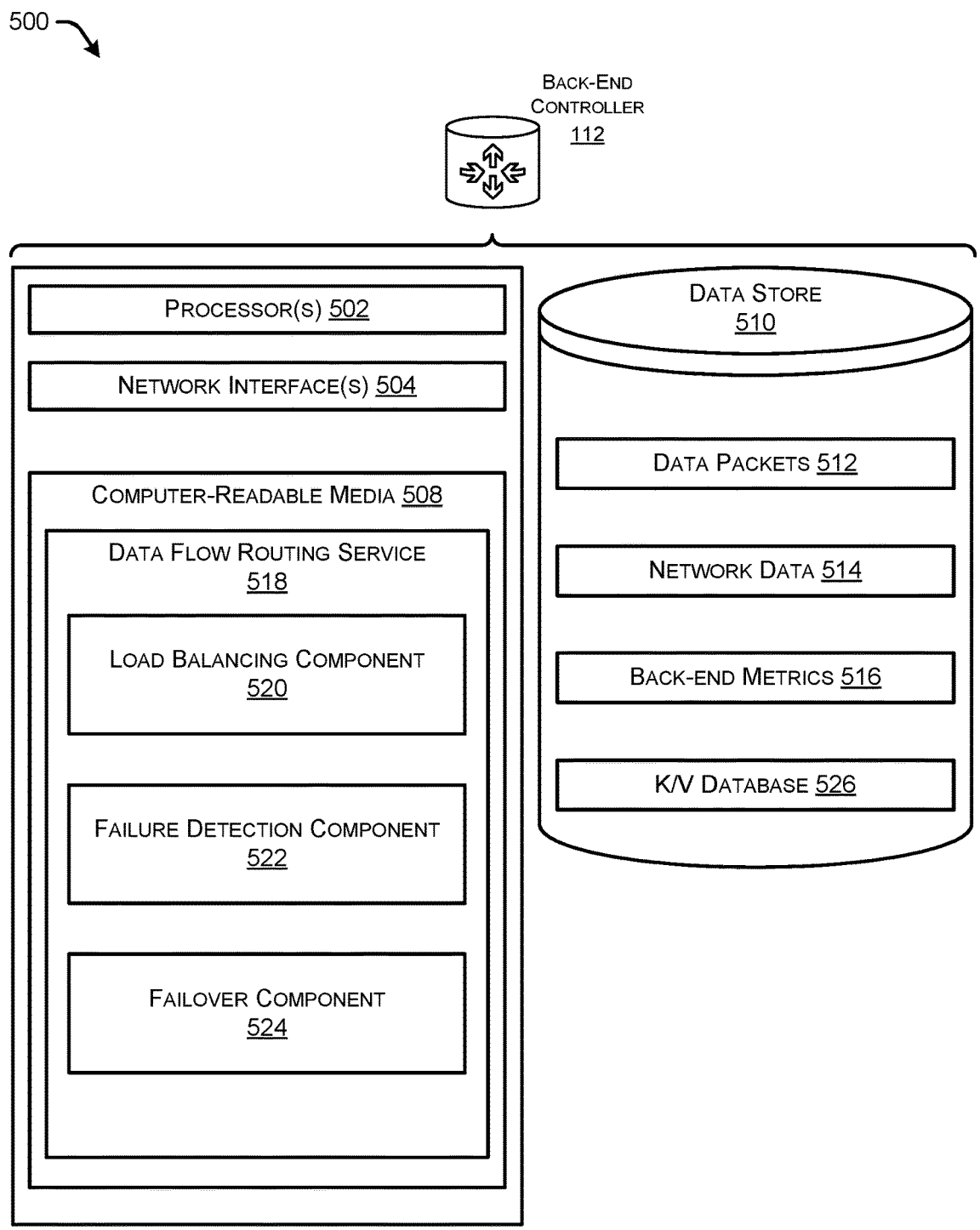
FIG. 5 is a component diagram of example components of a back-end controller of the AS of FIG. 1, according to an example of the principles described herein.

FIG. 5 is a component diagram 500 of example components of a back-end controller 112 of the AS 100 of FIG. 1, according to an example of the principles described herein. As illustrated, the front-end controller 110 may include one or more hardware processor(s) 502, one or more devices, configured to execute one or more stored instructions. The processor(s) 502 may comprise one or more cores. Further, the back-end controller 112 may include one or more network interfaces 504 configured to provide communications between the back-end controller 112 and other devices, such as the front-end nodes 106 within the front-end 114, the back-end nodes 108 within the back-end 116, and the endpoint devices 104. The network interface(s) 504 may include devices configured to couple to personal area networks (PANs), wired and wireless local area networks (LANs), wired and wireless wide area networks (WANs), and so forth. For example, the network interfaces 504 may include devices compatible with the wired and/or wireless communication technologies and protocols described herein.

The back-end controller 112 may also include computer-readable media 508 that stores various executable components (e.g., software-based components, firmware-based components, etc.). In addition to various components discussed herein, the computer-readable media 508 may further store components to implement functionality described herein. While not illustrated, the computer-readable media 508 may store one or more operating systems utilized to control the operation of the one or more devices that comprise the back-end controller 112. According to one example, the operating system comprises the LINUX operating system. According to another example, the operating system(s) comprise the WINDOWS SERVER operating system from MICROSOFT Corporation of Redmond, Wash. According to further examples, the operating system(s) may comprise the UNIX operating system or one of its variants. It may be appreciated that other operating systems may also be utilized.

Additionally, the back-end controller 112 may include a data store 510 which may comprise one, or multiple, repositories or other storage locations for persistently storing and managing collections of data such as databases, simple files, binary, and/or any other data. The data store 510 may include one or more storage locations that may be managed by one or more database management systems. The data store 510 may store, for example, data packets 512 for distribution to the front-end nodes 106, the back-end nodes 108, and the endpoint devices 104. The data packets 512 may include data sent via the AS 100 in a data session and within a data flow as described herein.

Further, the data store 510 may store network data 514. The network data 514 may include any data defining network topologies of the AS 100 including the front-end 114 and/or the back-end 116, the front-end nodes 106 and the links between the front-end nodes 106, the back-end nodes 108, the endpoint devices 104, and the links between the back-end nodes 108 and the endpoint devices 104, among other topological characteristics of the AS 100. Further, the network data 514 may include the RIB or other routing table that defines the routing information within the AS 100. The network data 514 may also include data defining the primary routes 118 and the failover routes 120 within the back-end 116 as described herein.

The data store 510 may also store back-end metrics 516 used in execution of the ECMP and BGP. In one example, the back-end metrics 516 may be stored along with the network data 514 in the RIB or other routing table within the data store 510. In this example, the RIB may list routes to particular network destinations along with a number of corresponding metrics associated with those routes. The back-end metrics 516 may also include metrics associated with the failure of the endpoint devices 104 in order to allow for the back-end controller 112 to begin failover processes to alleviate changes in the back-end 116. As noted above, the back-end metrics 516 may not be shared or otherwise transmitted to the front-end 114 including the front-end controller 110 and/or any of the front-end nodes 106.

The data store 510 may also store a key/value (K/V) database 526. The K/V database 526 may be any data storage environment for storing, retrieving, and managing associative arrays, and a dictionary and/or hash table. Dictionaries and hash tables include a number of objects or records which, in turn, have many different fields within them, each containing data. These records are stored and retrieved using a key that uniquely identifies the record, and is used to find the data within the K/V database 526. The K/V database 526 may be populated with data as the front-end nodes 106 and the back-end nodes 108 within the AS 100 come online and the control plane for the AS 100 determines failover nodes among the back-end nodes 108.

The computer-readable media 508 may store portions, or components, of a data flow routing service 518 described herein. For instance, the data flow routing service 518 of the computer-readable media 508 may include a load balancing component 520 to, when executed by the processor(s) 502, load-balance data traffic over multiple paths within the back-end 116 of the AS 100 as described herein.

The data flow routing service 518 of the computer-readable media 508 may also include a failure detection component 522. The failure detection component 522 may detect a failure among the endpoint devices 104 such as the failure of endpoint device 104-2 as described in the above examples.

In conjunction with the load balancing component 520 and the failure detection component 522, the data flow routing service 518 may further include a failover component 524 to, when executed by the processor(s) 502, perform the failover processes described herein. In one example, the failover component 524 may execute a BFD failover protocol to provide failure detection among the endpoint devices 104 and cause one or more of the failover routes 120 to be utilized within the back-end 116 when one or more of the primary routes 118 can no longer transmit data due to the failure of the endpoint device 104 (e.g., endpoint device 104-2 in the examples described herein). In one example, the failover component 524 may alter the IP address/MAC address/link mapping. In this example, a BFD failure may promote a backup MAC/link to be associated with the IP in the layer 2 (L2) address lookup of the last router in the fabric of the computer network. This example may provide the same handover effect as the BFD method. Other software-defined networking (SDN) solutions may be used to change this behavior by controlling the last route association described above.

Figure 6:
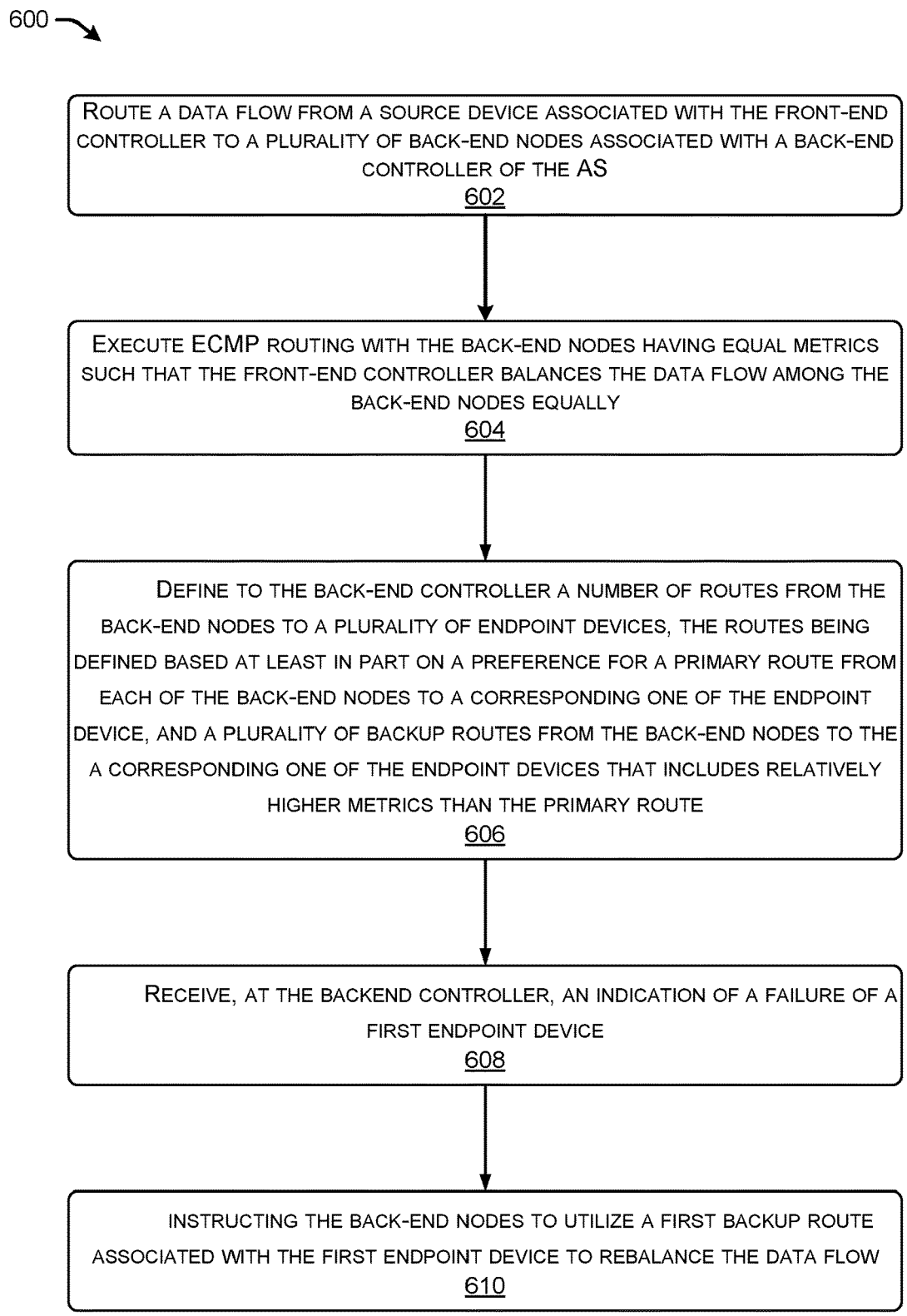
FIG. 6 illustrates a flow diagram of an example method for load balancing of data flows within a computer network, according to an example of the principles described herein.

FIG. 6 illustrates a flow diagram of an example method 600 for load balancing of data flows within a computer network, according to an example of the principles described herein. The method 600 of FIG. 6 is used to provide an AS 100 with ECMP persistent load balancing of data flows and a plurality of deterministic backend failover nodes (e.g., back-end nodes 108). In one example, the AS 100 and the methods described herein may be executed within a cloud-based network.

The method 600 may include, at 602, with the front-end controller 110 of the AS 100, routing a data flow from the source device 102 associated with the front-end controller 110 of the front-end 114 of the AS 100 to the plurality of back-end nodes 108 associated with the back-end controller 112 of the AS 100. In the examples described herein, the method 600 may use BGP enabled ECMP to load balance data flows without significant effects on a lost endpoint device 104 by removing the transfer of and/or the effects of the loss of per-flow data stored in the service for a data flow when the data flow is redirected to another service instance.

At 604, the method 600 may also include defining to the front-end controller 110 that balancing of the data flow to the back-end nodes 108 includes executing the ECMP routing with the back-end nodes 108 having equal metrics such that the front-end controller 110 balances the data flow among the back-end nodes 108 equally. The method 600 may also include, at 606, defining to the back-end controller 112 a number of primary routes 118 from the back-end nodes 108 to the plurality of endpoint devices 104. The routes 118, 120 may be defined based at least in part on a preference for a primary route 118 from each of the back-end nodes 108 to a corresponding one of the endpoint devices 104, and a plurality of failover routes 120 from the back-end nodes 108 to the corresponding one of the endpoint devices that includes relatively higher metrics than the primary route 118. In other words, the preference for the primary route 118 is such that until a failure occurs at one of the endpoint devices 104, the data flows will be directed via the primary routes 118. Further, the failover routes 120 are utilized when one of the primary routes 118 is lost due to the failure at one of the endpoint devices 104.

At 608, the back-end controller 112 may receive an indication of a failure of a first endpoint device 104. In the examples of FIGS. 1 through 3 and described herein, endpoint device 104-2 is the endpoint device depicted as having failed. In one example, the BFD failover protocol described herein may be executed by the back-end controller 112 to detect faults between the back-end nodes 108 and the endpoint devices 104. The method 600 may also include instructing, at 610, the back-end nodes 108 to utilize a first failover route 120 associated with the first endpoint device 104 to rebalance the data flow. In the examples depicted in FIGS. 1 through 3, the failover route 120-2 linking the second endpoint node 108 to the third endpoint device 104-R is utilized when the primary route 118-2 fails. In this manner, the method 600 of FIG. 6 is used to provide an AS 100 with ECMP persistent load balancing of data flows and a plurality of deterministic backend failover nodes (e.g., back-end nodes 108).

Figure 7:
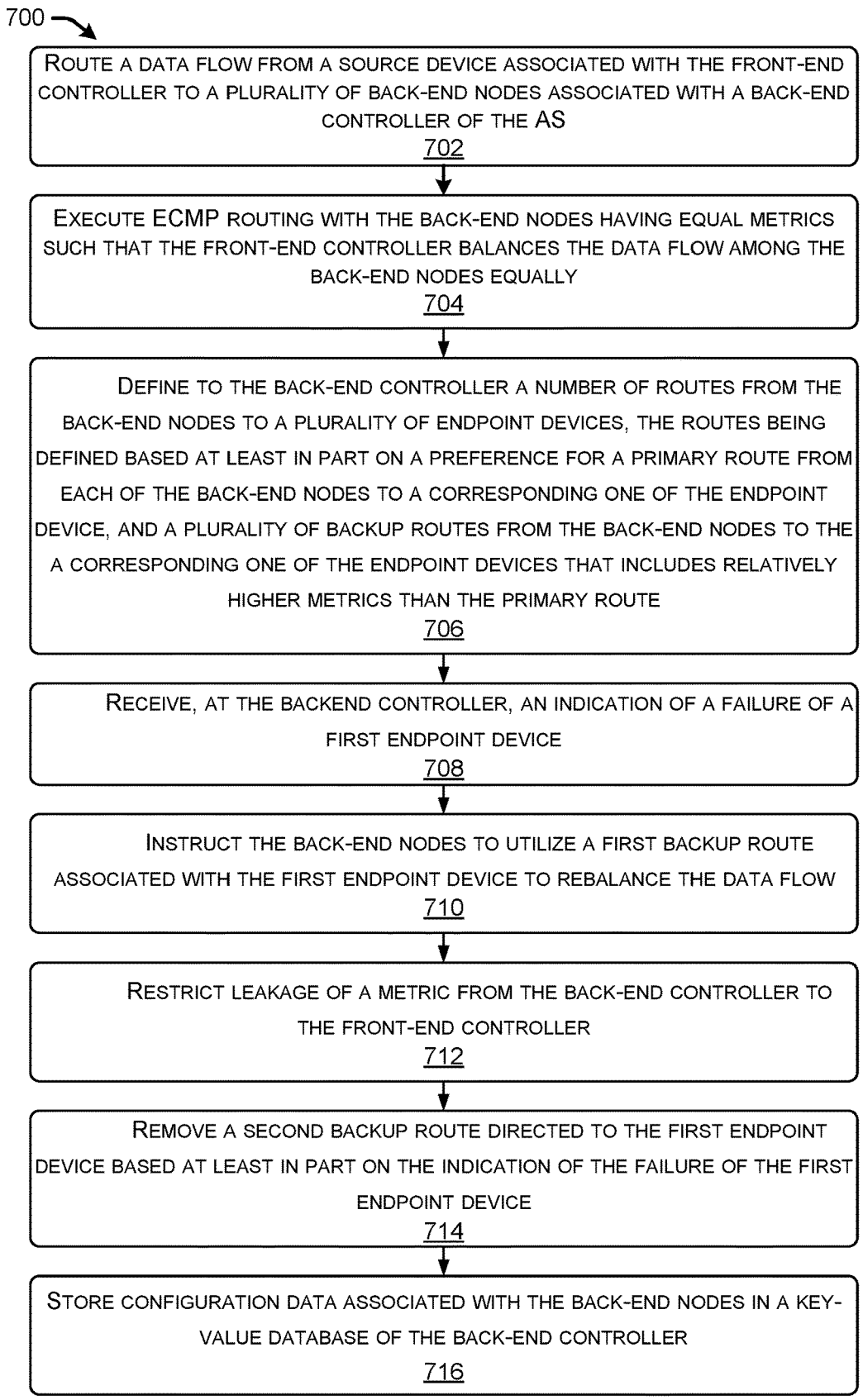
FIG. 7 illustrates a flow diagram of an example method for load balancing of data flows within a computer network, according to an example of the principles described herein.

FIG. 7 illustrates a flow diagram of an example method for load balancing of data flows within a computer network, according to an example of the principles described herein. Like the method 600 of FIG. 6, the method 700 of FIG. 7 is used to provide an AS 100 with ECMP persistent load balancing of data flows and a plurality of deterministic backend failover nodes (e.g., back-end nodes 108). In one example, the AS 100 and the methods described herein may be executed within a cloud-based network.

The method 700 of FIG. 7 may include, at 702, with the front-end controller 110 of the AS 100, routing a data flow from the source device 102 associated with the front-end controller 110 of the front-end 114 of the AS 100 to the plurality of back-end nodes 108 associated with the back-end controller 112 of the AS 100. In the examples described herein, the method 700 may use BGP enabled ECMP to load balance data flows without significant effects on a lost endpoint device 104 by removing the transfer of and/or the effects of the loss of per-flow data stored in the service for a data flow when the data flow is redirected to another service instance.

At 704, the method 700 may also include defining to the front-end controller 110 that balancing of the data flow to the back-end nodes 108 includes executing the ECMP routing with the back-end nodes 108 having equal metrics such that the front-end controller 110 balances the data flow among the back-end nodes 108 equally. The method 700 may also include, at 706, defining to the back-end controller 112 a number of primary routes 118 from the back-end nodes 108 to the plurality of endpoint devices 104. The routes 118, 120 may be defined based at least in part on a preference for a primary route 118 from each of the back-end nodes 108 to a corresponding one of the endpoint devices 104, and a plurality of failover routes 120 from the back-end nodes 108 to the corresponding one of the endpoint devices that includes relatively higher metrics than the primary route 118. In other words, the preference for the primary route 118 is such that until a failure occurs at one of the endpoint devices 104, the data flows will be directed via the primary routes 118. Further, the failover routes 120 are utilized when one of the primary routes 118 is lost due to the failure at one of the endpoint devices 104.

At 708, the back-end controller 112 may receive an indication of a failure of a first endpoint device 104. In the examples of FIGS. 1 through 3 and described herein, endpoint device 104-2 is the endpoint device depicted as having failed. In one example, the BFD failover protocol described herein may be executed by the back-end controller 112 to detect faults between the back-end nodes 108 and the endpoint devices 104. The method 700 may also include instructing, at 710, the back-end nodes 108 to utilize a first failover route 120 associated with the first endpoint device 104 to rebalance the data flow. In the examples depicted in FIGS. 1 through 3, the failover route 120-2 linking the second endpoint node 108 to the third endpoint device 104-R is utilized when the primary route 118-2 fails.

At 712, the back-end controller 112 may restrict leakage of a metric from the back-end 116 including the back-end controller 112, the back-end nodes 108, and/or the endpoint devices 104 to any portion of the front-end 114 including the front-end controller 110, the source device 102, and/or the front-end nodes 106. In this manner, the metrics obtained in the back-end 116 may not be used to influence the manner in which the front-end 114 load balances the data flows within the AS 100.

The method 700 may also include, at 714, removing a second failover route 120 directed to the failed endpoint device 104. In the examples of FIGS. 1 through 3, the failed endpoint device 104 is endpoint device 104-2, and the second failover route 120 is failover route 120-1 between the first back-end node 108-1 and the endpoint device 104-2. This removal of the second failover route 120 may be performed based at least in part on the indication of the failure of the failed endpoint device 104 (e.g., endpoint device 104-2).

At 716, the method 700 may also include storing configuration data associated with the back-end nodes 108 in a key/value (K/V) database of the back-end controller. The K/V database 526 may be any data storage environment for storing, retrieving, and managing associative arrays, and a dictionary and/or hash table. Dictionaries and hash tables include a number of objects or records which, in turn, have many different fields within them, each containing data. These records are stored and retrieved using a key that uniquely identifies the record, and is used to find the data within the K/V database 526. The K/V database 526 may be populated with data as the front-end nodes 106 and the back-end nodes 108 within the AS 100 come online and the control plane for the AS 100 determines failover nodes among the back-end nodes 108.

In this manner, the method 700 of FIG. 7 is used to provide an AS 100 with ECMP persistent load balancing of data flows and a plurality of deterministic backend failover nodes (e.g., back-end nodes 108).

Figure 8:
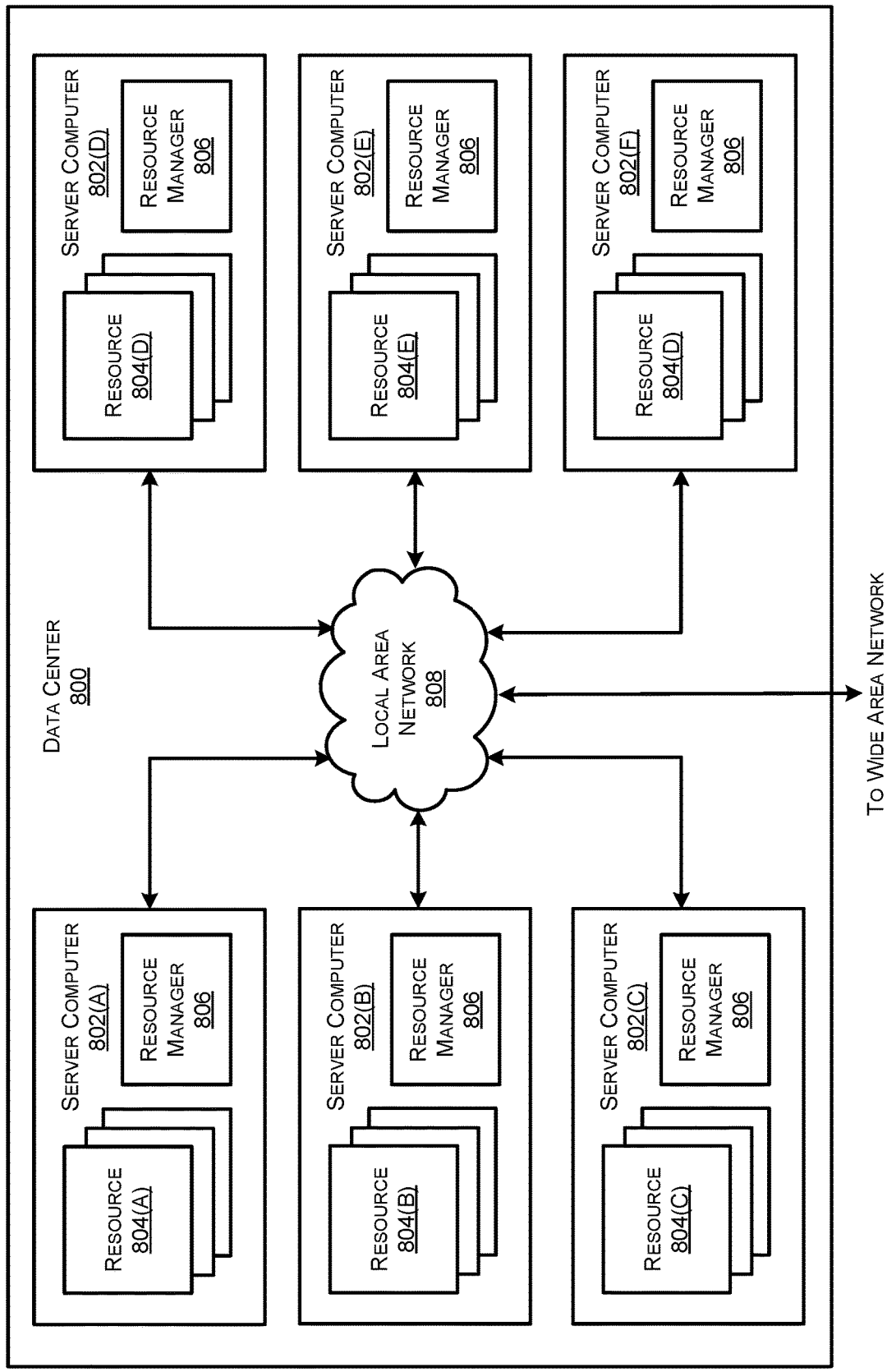
FIG. 8 illustrates a computing system diagram illustrating a configuration for a data center that can be utilized to implement aspects of the technologies disclosed herein.

FIG. 8 illustrates a computing system diagram illustrating a configuration for a data center 800 that can be utilized to implement aspects of the technologies disclosed herein. The example data center 800 shown in FIG. 8 includes several server computers 802A-802F (which might be referred to herein singularly as "a server computer 802" or in the plural as "the server computers 802) for providing computing resources. In some examples, the resources and/or server computers 802 may include, or correspond to, the any type of networked device described herein. Although described as servers, the server computers 802 may comprise any type of networked device, such as servers, switches, routers, hubs, bridges, gateways, modems, repeaters, access points, etc.

The server computers 802 can be standard tower, rackmount, or blade server computers configured appropriately for providing computing resources. In some examples, the server computers 802 may provide computing resources 804 including data processing resources such as VM instances or hardware computing systems, database clusters, computing clusters, storage clusters, data storage resources, database resources, networking resources, virtual private networks (VPNs), and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 800 can also be configured to provide network services and other types of services.

In the example data center 800 shown in FIG. 8, an appropriate LAN 808 is also utilized to interconnect the server computers 802A-802F. It may be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 800, between each of the server computers 802A-802F in each data center 800, and, potentially, between computing resources in each of the server computers 802. It may be appreciated that the configuration of the data center 800 described with reference to FIG. 8 is merely illustrative and that other implementations can be utilized.

In some examples, the server computers 802 and or the computing resources 804 may each execute/host one or more tenant containers and/or virtual machines to perform techniques described herein.

In some instances, the data center 800 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like tenant containers and VM instances, data storage resources, networking resources, data communication resources, network services, VPN instances, and the like.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 804 not mentioned specifically herein.

The computing resources 804 provided by a cloud computing network may be enabled in one example by one or more data centers 800 (which might be referred to herein singularly as "a data center 800" or in the plural as "the data centers 800). The data centers 800 are facilities utilized to house and operate computer systems and associated components. The data centers 800 typically include redundant and backup power, communications, cooling, and security systems. The data centers 800 can also be located in geographically disparate locations. One illustrative example for a data center 800 that can be utilized to implement the technologies disclosed herein will be described below with regard to FIG. 9.

Figure 9:
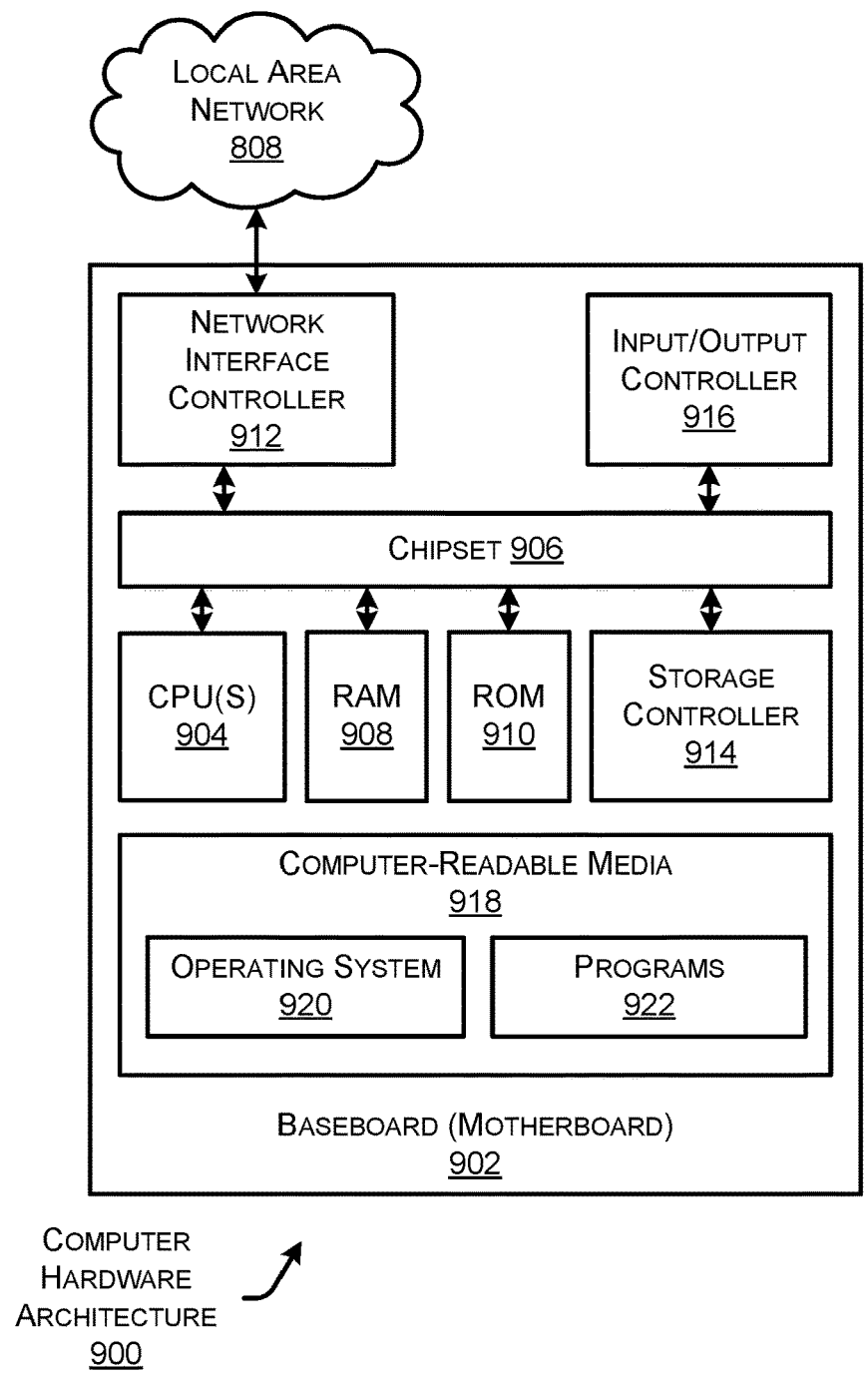
FIG. 9 illustrates a computer architecture diagram showing an example computer hardware architecture for implementing a computing device that can be utilized to implement aspects of the various technologies presented herein.

FIG. 9 illustrates a computer architecture diagram showing an example computer hardware architecture 900 for implementing a computing device that can be utilized to implement aspects of the various technologies presented herein. The computer hardware architecture 900 shown in FIG. 9 illustrates a server computer 802, network device (e.g., source device 102, a front-end controller 110, a front-end node 106, a back-end controller 112, a back-end node 108, an endpoint device 104, load balancer, data store, etc.), workstation, desktop computer, laptop, tablet, network appliance, e-reader, smartphone, or other computing device, and can be utilized to execute any of the software components presented herein. The computer 900 may, in some examples, correspond to a network device (e.g., the source device 102, a front-end controller 110, a front-end node 106, a back-end controller 112, a back-end node 108, an endpoint device 104) described herein, and may comprise networked devices such as servers, switches, routers, hubs, bridges, gateways, modems, repeaters, access points, etc.

The computer 900 includes a baseboard 902, or "motherboard," which is a printed circuit board to which a multitude of components or devices can be connected by way of a system bus or other electrical communication paths. In one illustrative configuration, one or more central processing units (CPUs) 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory (ROM) 910 or non-volatile RAM (NVRAM) for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the AS 100. The chipset 906 can include functionality for providing network connectivity through a Network Interface Controller (NIC) 912, such as a gigabit Ethernet adapter. The NIC 912 is capable of connecting the computer 900 to other computing devices over the AS 100. It may be appreciated that multiple NICs 912 can be present in the computer 900, connecting the computer to other types of networks and remote computer systems. In some examples, the NIC 912 may be configured to perform at least some of the techniques described herein, such as packet redirects and/or other techniques described herein.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different examples of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the storage device 918 described above, the computer 900 can have access to other computer-readable storage media to store and retrieve information, such as program modules, data structures, or other data. It may be appreciated by those skilled in the art that computer-readable storage media is any available media that provides for the non-transitory storage of data and that can be accessed by the computer 900. In some examples, the operations performed by the AS 100 and or any components included therein, may be supported by one or more devices similar to computer 900. Stated otherwise, some or all of the operations performed by the AS 100, and or any components included therein, may be performed by one or more computer devices 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one example, the operating system 920 comprises the LINUX operating system. According to another example, the operating system comprises the WINDOWS® SERVER operating system from MICROSOFT Corporation of Redmond, Wash. According to further examples, the operating system can comprise the UNIX operating system or one of its variants. It may be appreciated that other operating systems can also be utilized. The storage device 918 can store other system or application programs and data utilized by the computer 900.

In one example, the storage device 918 or other computer-readable storage media is encoded with computer-executable instructions which, when loaded into the computer 900, transform the computer from a general-purpose computing system into a special-purpose computer capable of implementing the examples described herein. These computer-executable instructions transform the computer 900 by specifying how the CPUs 904 transition between states, as described above. According to one example, the computer 900 has access to computer-readable storage media storing computer-executable instructions which, when executed by the computer 900, perform the various processes described above with regard to FIGS. 1-7. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

As described herein, the computer 900 may comprise one or more of a source device 102, a front-end controller 110, a front-end node 106, a back-end controller 112, a back-end node 108, an endpoint device 104, or a network device (e.g., server computer 802, computing resource, router, etc.). The computer 900 may include one or more hardware processor(s) such as the CPUs 904 configured to execute one or more stored instructions. The CPUs 904 may comprise one or more cores. Further, the computer 900 may include one or more network interfaces configured to provide communications between the computer 900 and other devices, such as the communications described herein as being performed by the source device 102, a front-end controller 110, a front-end node 106, a back-end controller 112, a back-end node 108, an endpoint device 104. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 922 may comprise any type of programs or processes to perform the techniques described in this disclosure for providing an AS 100 with ECMP persistent load balancing of data flows and a plurality of deterministic backend failover nodes (e.g., back-end nodes 108). The programs 922 may enable the source device 102, a front-end controller 110, a front-end node 106, a back-end controller 112, a back-end node 108, and/or an endpoint device 104 to perform various operations.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative some examples that fall within the scope of the claims of the application.

What is claimed is:

1. A method comprising:
   with a controller of an autonomous system (AS), routing a data flow from a source device, through at least one front-end node associated with a front-end of the AS to a plurality of back-end nodes associated with a back-end of the AS;
   balancing, by the controller, the data flow from the at least one front-end node to the back-end nodes equally based at least in part on equal-cost multi-path (ECMP) routing;
   determining, by the controller, a number of routes from the back-end nodes to a plurality of endpoint devices, the routes being determined based at least in part on:
   a preference for a primary route from the back-end nodes to a corresponding one of the endpoint devices, and
   a plurality of backup routes from the back-end nodes to the corresponding one of the endpoint devices;
   receiving, at the controller, an indication of a failure of a first endpoint device of the plurality of endpoint devices;
   instructing the back-end nodes to utilize a first backup route of the plurality of backup routes that is associated with a second endpoint device to rebalance the data flow from the first endpoint device to the second endpoint device; and
   refraining from providing a data-flow metric from the back-end and to the front-end such that the front-end balances subsequent data flows independent of using the data-flow metric.

2. The method of claim 1, wherein executing ECMP routing is based at least in part on a routing table defined by the controller.

3. The method of claim 1, wherein executing ECMP routing is based at least in part on border gateway protocol (BGP).

4. The method of claim 1, further comprising removing a second backup route directed to the first endpoint device based at least in part on the indication of the failure of the first endpoint device.

5. The method of claim 1, wherein executing the ECMP routing includes load balancing the data flow across the back-end nodes irrespective of the endpoint devices discovered in resolving the ECMP routing.

6. The method of claim 1, further comprising storing configuration data associated with the back-end nodes in a database of the controller.

7. The method of claim 1, wherein:
   instructing the back-end nodes to utilize the first backup route associated with the first endpoint device to rebalance the data flow includes executing a bidirectional forwarding detection (BFD) failover protocol, and
   the plurality of backup routes include relatively higher metrics than the primary routes.

8. A system comprising:
   one or more processors; and
   one or more non-transitory computer-readable media storing instructions that, when executed by the one or more processors, cause the one or more processors to perform operations comprising:
   routing a data flow from a source device, through at least one front-end node associated with a front-end of an autonomous system (AS) to a plurality of back-end nodes associated with a back-end of the AS;
   executing, with a controller, equal-cost multi-path (ECMP) routing to balance the data flow to the back-end nodes equally;
   determining, by the controller, a number of routes from the back-end nodes to a plurality of endpoint devices, the routes being determined based at least in part on:
   a preference for a primary route from the back-end nodes to a corresponding one of the endpoint devices, and
   a plurality of backup routes from the back-end nodes to the corresponding one of the endpoint devices;
   receiving, at the controller, an indication of a failure of a first endpoint device of the plurality of endpoint devices, the failure of the first endpoint device resulting in the unavailability of a first primary route and a first backup route associated with the first endpoint device; and instructing the back-end nodes to utilize a second backup route of the plurality of backup routes that is associated with a second endpoint device to rebalance the data flow from the first endpoint device to the second endpoint device.

9. The system of claim 8, the operations further comprising restricting leakage of at least one metric from the back-end to the front-end.

10. The system of claim 8, wherein executing ECMP routing is based at least in part on a routing table defined by the controller.

11. The system of claim 8, wherein executing ECMP routing is based at least in part on border gateway protocol (BGP).

12. The system of claim 8, wherein executing the ECMP routing includes load balancing the data flow across the back-end nodes irrespective of the endpoint devices discovered in resolving the ECMP routing.

13. The system of claim 8, the operations further comprising storing configuration data associated with the back-end nodes in a database of the controller.

14. The system of claim 8, wherein:

instructing the back-end nodes to utilize the second backup route associated with the first endpoint device to rebalance the data flow includes executing a bidirectional forwarding detection (BFD) failover protocol, and the plurality of backup routes include relatively higher metrics than the primary routes.

15. A non-transitory computer-readable medium storing instructions that, when executed, cause one or more processors to perform operations, comprising:

with a controller of an autonomous system (AS), routing a data flow from a source device, through at least one front-end node associated with a front-end of the AS to a plurality of back-end nodes associated with a back-end of the AS;

balancing, by the controller, the data flow to the back-end nodes equally based at least in part on equal-cost multi-path (ECMP) routing;

determining, by the controller, a number of routes from the back-end nodes to a plurality of endpoint devices, the routes being determined based at least in part on:
a preference for a primary route from the back-end nodes to a corresponding one of the endpoint devices, and
a plurality of backup routes from the back-end nodes to the corresponding one of the endpoint devices;

receiving, at the controller, an indication of a failure of a first endpoint device of the plurality of endpoint devices, the failure of the first endpoint device resulting in the unavailability of a first primary route and a first backup route associated with the first endpoint device; and instructing the back-end nodes to utilize a second backup route of the plurality of backup routes that is associated with a second endpoint device to rebalance the data flow from the first endpoint device to the second endpoint device.

16. The non-transitory computer-readable medium of claim 15, the operations further including restricting leakage of at least one metric from the back-end to the front-end.

17. The non-transitory computer-readable medium of claim 15, wherein executing the ECMP routing includes load balancing the data flow across the back-end nodes irrespective of the endpoint devices discovered in resolving the ECMP routing.

18. The non-transitory computer-readable medium of claim 15, wherein executing the ECMP routing includes adjusting a mapping within a routing table to include a backup link.

* * * * *